April 27, 1943.                G. L. KOTHNY                2,317,386
                          WELL SURVEYING INSTRUMENT
                            Filed March 14, 1942
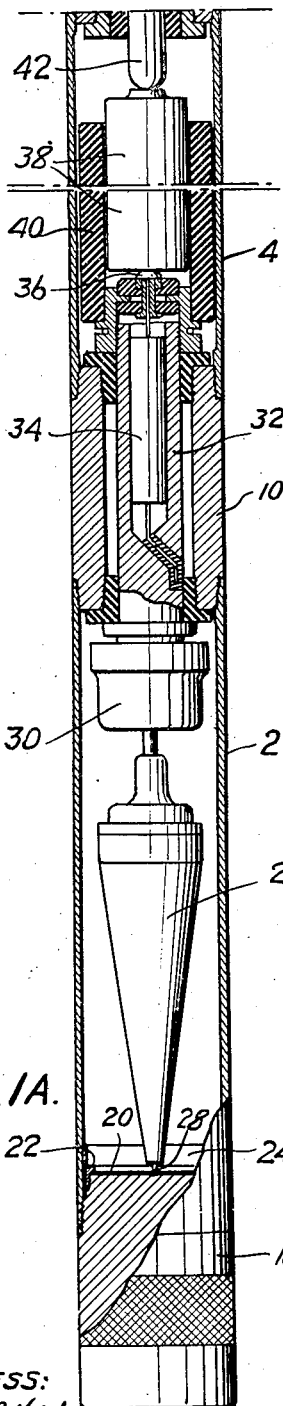
FIG. IA.
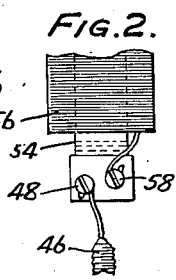
FIG. 2.
FIG. 3.
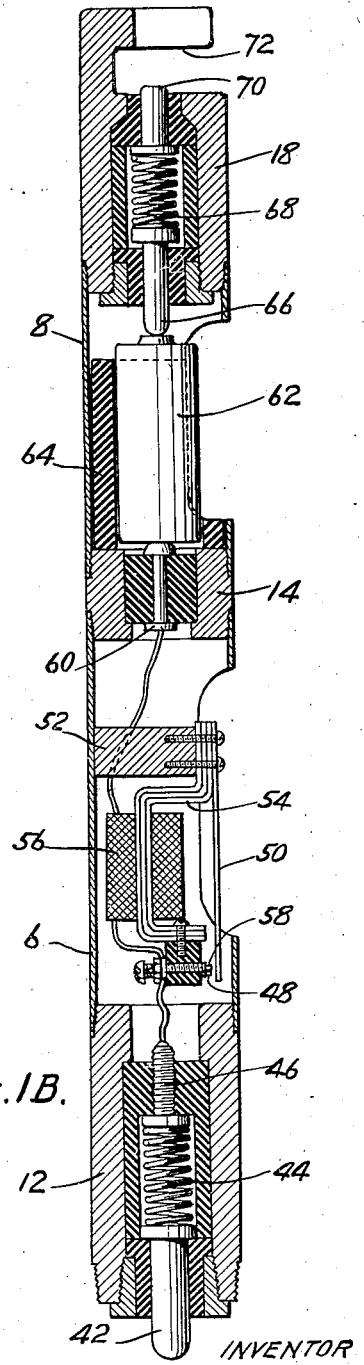
FIG. IB.
INVENTOR
Gottdank L. Kothny
BY
ATTORNEYS.
WITNESS:

Patented Apr. 27, 1943

2,317,386

UNITED STATES PATENT OFFICE 2,317,386

WELL SURVEYING INSTRUMENT

Gottdank L. Kothny, Strafford, Pa., assignor to Sperry-Sun Well Surveying Company, Philadelphia, Pa., a corporation of Delaware Application March 14, 1942, Serial No. 434,726

6 Claims. (Cl. 33—205.5)

This invention relates to a well surveying instrument, and has particular reference to the surveying of bore holes by the so-called go-devil method.

In the patent to Roland Ring, 2,246,319, dated June 17, 1941, and in an application of said Roland Ring, Serial No. 379,835, filed February 20, 1941, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent and application, the operation of said instrument may be described as follows:

If the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with surveying instruments involves their being dropped freely through a drill stem so that they come to rest in a position adjacent the bit. During this location in a position of rest, a record is made under the control of suitable timing means, and the instrument is then recovered when the bit is brought to the surface. Generally speaking, such go-devil records are made at a time when it is necessary to bring the bit to the surface to check the condition of the bit.

In the use of said Ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficiently continuous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workmen, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for terminating the recording action at a desired time, being particularly useful for termination of the recording action following the completion of a single record or a series of records.

This and other objects of the invention, particularly relating to details, will become apparent from the following description, read in conjunction with the accompanying drawing, in which:

Figures 1A and 1B are, respectively, longitudinal sectional views through the lower and upper portions of a well surveying instrument;

Figure 2 is a fragmentary sectional view showing wiring details; and

Figure 3 is a wiring diagram illustrating the fashion in which the instrument operates.

The instrument illustrated in the drawing is basically of the type disclosed in said Ring patent and application, and comprises an inner casing adapted to be located in a fluid-tight protective casing in use. The inner casing comprises tubes 2, 4, 6, and 8, joined by coupling members 10, 12 and 14. Threaded into the bottom of the lowermost tube 2 is a plug 16, on which may be secured the record member 20 by means of a threaded ring 22, though the record member may be secured on the plug, for example by depression without a flanged portion thereof. This record member, as described in detail in said Ring patent and application, preferably comprises a sheet of paper containing a colored material such as a colored metallic ferrocyanide which, upon the passage of an electrical current while it is moist will be marked with a white spot by reason of the formation of alkali at a cathode provided by a metallic point 28 slidable within a pendulum 26, mounted for universal pivotal movement in a bearing arrangement 30. An insulating ring 24 prevents short circuiting by preventing contact of the pendulum with the metallic wall of the tube 2.

The bearing 30 is mounted at the lower end of a cylindrical pin 32, which extends through an opening in the coupling member 10 and is insulated therefrom as indicated. Within 32 is a resistor 34, the lower lead of which is soldered within an opening in the member 32 while the upper lead of which resistor is electrically connected to a contact button 36 on which may rest the bottom of the lowermost of a group of batteries 38, arranged in series, in flashlight fashion, and held within an insulating tube 40. Contact with the positive pole of the uppermost battery is made by means of a metallic pin 42 urged downwardly by a spring 44 which in turn makes electrical contact with a screw 46. The pin 42, spring 44 and screw 46 are mounted in an insulating insert arrangement within the coupling member 12.

The instrument, to the extent so far described, is essentially the Ring instrument of said patent and application. From the electrical standpoint, if the screw 46 were connected to the casing providing the ground of the instrument, the operation would be identical with that described above for the Ring instrument.

In accordance with the present invention, however, the screw 46 is connected by means of a wire with a contact point 48 adapted to be engaged by an armature 50, secured and grounded to the tube 6 through a metallic supporting block 52. The iron core of an electromagnet is provided, as indicated at 54, by means of a series of laminations or a solid piece of iron carried by the block 52. This core has wound thereon the coil 56 passage of current through which serves to energize the electromagnet and effect maintenance of the armature 50 in engagement with the contact point 48. A second contact point 58, located immediately adjacent the contact point 48, and also adapted to be engaged by the armature 50, is connected to one end of the coil 56, the other end of which is connected to a pin 60 carried in insulated fashion within the coupling member 14. Engaging this pin is the lower end of the casing of the battery 62, mounted within an insulating sleeve 64, and having its central positive pole engaging a pin 66, which is pressed downwardly by a spring 68, which also presses upwardly a second pin 70, the pins 66 and 70 and the spring 68 being mounted in an insulated assembly, as indicated, located within the upper plug 18 of the instrument. The tube 8 and sleeve 64 may be cut away as indicated for the convenient location and removal of the battery through the side of the instrument. This is desirable since the battery 62 is exhausted at each operation, as described below. The plug 18 is provided with a slot 72 adapted to receive a headed member on the outer protective casing of the instrument, whereby the instrument is mounted within such casing. When this head of the connecting member enters the slot, since it is metallic, it effects grounding between the pin 70 and the plug 18.

It will be evident from the description that the electrical interconnection of the parts gives rise to the configuration indicated in Figure 3.

The armature 50 is desirably of quite thin and light spring steel, while the core 54 is of soft iron. The arrangement is such that the armature is normally slightly spaced from the contact points 48 and 58, as indicated, these contact points being adjustable to secure the proper operating positions. Accordingly, when the instrument is assembled as indicated in Figures 1A and 1B with small flashlight cells in the positions indicated at 38 and 62, even though the slot 72 receives the connecting member of the protective casing, the electrical circuits involved will be uncompleted, since the armature 50 is spaced from both contacts 48 and 58 and they are insulated from each other in their carrying block. If it is desired to operate the instrument, a battery which is in good condition is located in the position 62. As will be pointed out hereafter, this battery is completely drained in the normal operation of the instrument and cannot be reused. The current drain on the batteries 38, however, is very slight, and they may be used repeatedly over a very long period of time.

To prepare the instrument for operation, it is merely necessary to press the armature 50 inwardly by means of a finger, so that it engages the contact points 48 and 58. It will be evident that as soon as it engages the contact point 58, current will flow through coil 56 from the battery 62, the amount of this current being limited by the resistance of the coil and the internal resistance of the battery, together with the other slight incidental resistances in the circuit. Initially, this current will be sufficient to maintain the armature attracted, by the electromagnet, and consequently to maintain contact between the armature and the points 48 and 58. The engagement with the point 48, as will be evident from Figure 3, closes the circuit through the pendulum point, so that the instrument is in condition for recording.

During the descent of the instrument into the bore hole, for example in go-devil fashion, the pendulum will move about so that, as indicated above, no noticeable record will be made upon the disc 20. After the instrument reaches its position of rest at the bottom of the drill stem, it will be permitted to remain in such position for sufficient time for a record to be made. Thereupon the drill stem may, if desired, be raised to other levels and the instrument permitted to remain at each of these for sufficient time to produce additional records. If these times of rest are different, the records may be readily distinguished from each other and correlated with the depths.

Throughout all this period, the battery 62 will maintain the flow of current through the coil 56 at a sufficient value to keep the armature 50 attracted. If this armature is made of a very light spring steel, as indicated, and the other parts are suitably designed to provide a sufficient force of attraction, the inertia of the armature will be quite low, and the jarring occurring upon go-devil dropping of the instrument and other incidental movements will be insufficient to dislodge the armature from the contact points. Accordingly, throughout the recording period, the circuits will remain closed.

If, however, the various parts are properly designed as to strength of the armature spring 50, positioning of the contact points, resistance and number of turns of the coil 56 and low resistance contacts and the like, the current supplied by the battery 62 will fall off relatively rapidly until, after a proper interval of time, the current flowing through the coil 56 will no longer be able to maintain the armature attracted against its resilient tendency to snap away from the contact points. By properly relating the various factors mentioned above, and in particular by drawing a quite heavy current from the battery 62 so as to exhaust it to a substantial degree in a relatively short period of time, the interval before the armature moves away from the contact points may be predetermined with sufficient accuracy to effect the desired end. For example, by providing for a proper rate of drain of the battery, the opening of the armature circuit may be caused to take place in, say, thirty minutes with a possible quite large error, but with one which is, nevertheless, immaterial. For example, aiming at an opening of the armature circuit at the end of a thirty minute interval, it is quite possible that the opening may occur at almost any time between about a fifteen minute delay and a forty-five minute delay. But even an error of this sort, which, by most standards, would be considered quite large, would be quite permissible, since the dropping of the instrument and all recordings would, in the great majority of instances, be completed well within the first fifteen minutes after the operation was started and the subsequent removal of the drill stem would not be interrupted for a rest period prior to the expiration of, say, an hour. Thus proper operation of the instrument is assured through the period of desired recording and the stopping of its operation is assured well prior to a time when undesired records might be made.

The use of the exhaustion characteristics of a battery in this fashion is particularly simple and inexpensive, since batteries suitable for this operation, being of the smallest flashlight size, cost only a few cents and may be thrown away without any loss after performing their operations. Such batteries, it is found, are fairly uniform in their exhaustion characteristics, which involve an initial rapid drop of current flow as polarization occurs followed by a steady reduction of current flow as drainage takes place. This falling characteristic is not of very steep slope, and since the attraction characteristics of the electromagnet and the armature are also not extremely well defined, fairly large percentage errors such as indicated above may occur in the time of the circuit opening. In order to secure maximum uniformity of characteristics, good contacts of low uniform resistivity are desirable in the circuit, and consequently the lower portion of pin 66, the upper portion of pin 69, and the portion of the armature at 50, which is adapted to engage the contact point 58, are desirably silvered and maintained clean. The spring 68 is also desirably fairly strong and adapted to make clean low resistance contacts with the pins 66 and 70, the latter of which should also make a low resistance contact with the portion of the casing entering the slot 72. Incidental resistances in the pendulum circuit are of little moment in view of the high resistance appearing at the pendulum point and also the high value of the ballast resistor 34.

The external resistance of the circuit of the battery 62 may be determined completely by the resistance of the coil 56 or this coil may be in shunt or in series with resistors providing greater or less resistance in the battery circuit and consequently variation of the drainage rate of the battery. Such shunt resistances may, for example, be supplied in different values to secure different timings if they are necessary. Standard practices, however, are substantially uniformly applicable, precluding any serious necessity for adjustability, and consequently, the parts may be designed to give uniformly a mean delay time of, for example, thirty minutes.

It will be evident that the principles of the invention may be embodied in other fashions than that specifically herein disclosed and that, consequently, the invention is not to be regarded as limited except to the extent indicated by the following claims.

What I claim and desire to protect by Letters Patent is:

1. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising a battery, and a circuit for drawing heavy currents from said battery so that the current falls off rapidly thereby to effect a controlling action.

2. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising a battery, and a circuit including a relay for drawing heavy currents from said battery so that the current energizing said relay falls off rapidly thereby to effect a controlling action by the relay.

3. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising a battery, and a circuit including relay means for drawing heavy currents from said battery so that a potential controlling said relay means falls off rapidly thereby to effect a controlling action by the relay means.

4. A well surveying instrument comprising a casing adapted to enter a bore hole, means for supporting a record member within said casing, means, comprising an electrical circuit, for effecting marking of said record member in accordance with the position of said casing, and means responsive to partial exhaustion of a battery by the drawing of heavy currents therefrom for controlling flow of current in said circuit.

5. A well surveying instrument comprising a casing adapted to enter a bore hole, means for supporting a record member within said casing, means responsive to the position of the instrument for effecting slow marking of said record member, said responsive means being subject to disturbance by movements of the instrument and being active without interruption for any substantial time during an extended period of location of the instrument within a bore hole to effect such marking, the rate at which appreciable marking of said record member occurs being so low that during movements of the instrument during said extended period no appreciable marking occurs, and means responsive to partial exhaustion of a battery by the drawing of heavy currents therefrom, for interrupting said marking, so that, following a marking operation during a stationary period of said instrument, marking during a subsequent stationary period may be prevented.

6. A well surveying instrument comprising a casing adapted to enter a bore hole, means for supporting a record member within said casing, means responsive to inclination of the instrument for effecting slow marking of said record member, said responsive means being subject to disturbance by movements of the instrument and being active without interruption for any substantial time during an extended period of location of the instrument within a bore hole to effect such marking, the rate at which appreciable marking of said record member occurs being so low that during movements of the instrument during said extended period no appreciable marking occurs, and means responsive to partial exhaustion of a battery by the drawing of heavy currents therefrom for interrupting said marking, so that, following a marking operation during a stationary period of said instrument, marking during a subsequent stationary period may be prevented.

GOTTDANK L. KOTHNY.